No. 844,664. PATENTED FEB. 19, 1907.
J. DAWSON.
RECORDING DEVICE.
APPLICATION FILED NOV. 7, 1904.

Witnesses:
O. M. Wernich
Jno. L. Hanley

Inventor:
John Dawson
By D. W. Hopkins
Atty.

UNITED STATES PATENT OFFICE.

JOHN DAWSON, OF CHICAGO, ILLINOIS, ASSIGNOR TO RAND, McNALLY & CO., OF CHICAGO, ILLINOIS, A CORPORATION.

RECORDING DEVICE.

No. 844,664.      Specification of Letters Patent.      Patented Feb. 19, 1907.

Application filed November 7, 1904. Serial No. 231,727.

*To all whom it may concern:*

Be it known that I, JOHN DAWSON, a citizen of the United States, residing at Chicago, in the county of Cook and State of Illinois, have invented certain new and useful Improvements in Recording Devices, of which the following is a specification.

The present invention relates to a device for easily and quickly making a graphic record of facts relating to doings or transactions of various kinds, the itinerary of a traveling salesman being an example. For the purposes of this application I will describe this use of the invention, but with the understanding that I reserve to myself the exclusive right to use it for all other purposes for which it is adapted. A device embodying this use of the invention is for the purpose of enabling the person having charge of one or more traveling salesmen to first map out a route for each of them and then when each is sent out record in a graphic manner his progress from point to point and his present whereabouts.

To this end the invention consists in the features of novelty that are hereinafter described with reference to the accompanying drawings, which are made a part hereof, and in which—

Figure 1:
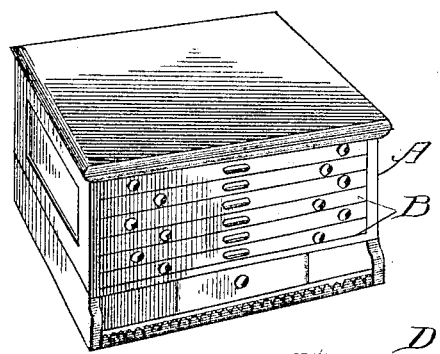
Figure 2:
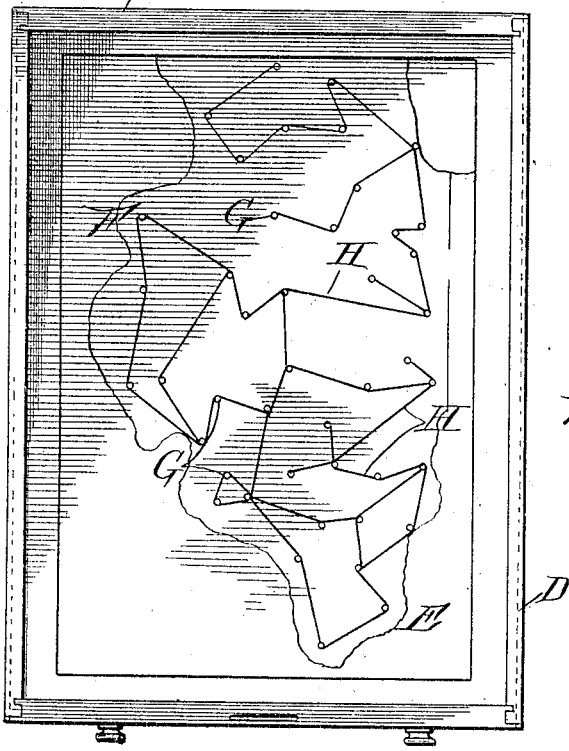
Figure 3:
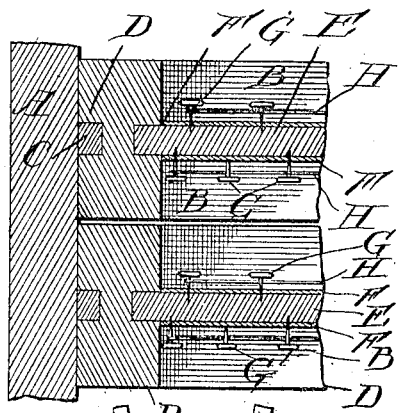
Figure 4:
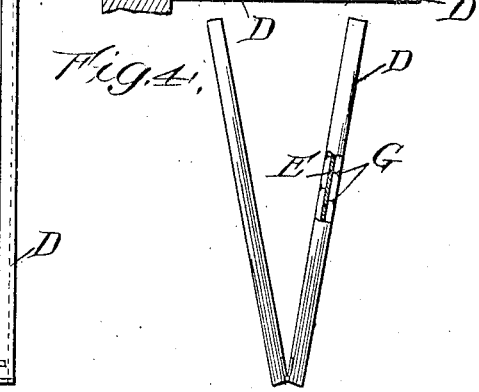

Figure 1 is a perspective view of a recording device arranged in the form of a cabinet and embodying the invention. Fig. 2 is a plan view of one of the slides thereof. Fig. 3 is an enlarged section of fragments of two of the slides and the adjacent wall of the cabinet. Fig. 4 is an elevation of a modification.

A represents the cabinet proper, and B the slides, any number of which may be used, each being provided with means coöperating with the cabinet for supporting it independently of the others and permitting it to slide in and out after the manner of a drawer.

In Fig. 3 I have shown each of the slides as being provided in its sides with grooves for receiving supporting-ribs C, projecting from the inner faces of the side walls of the cabinet. Each of these slides comprises a rectangular frame D and a panel E, secured therein in such position that the frame projects equal distances from the opposite faces of the panel for a purpose that will appear presently. The panel is preferably made of soft wood; but any other material that will answer the purpose may be used. It forms, in fact, the backing for two maps or diagrams F, which are pasted or otherwise secured to its opposite faces, the thickness of the map being exaggerated in Fig. 3 of the drawings for the sake of clearness. The panel or backing should be made of such material that tacks or pins G may be stuck into it by thumb-pressure at various points on the map, and these tacks or pins are adapted to have a cord H led from one to another, if desired. The tacks or pins may be distinguished in any suitable manner—as, for example, by making their heads of different colors or by placing inscriptions on them.

The differentiated tacks or pins are intended to represent different facts. These facts vary in various lines of business, and it must be left to the business house using the device to devise a system adapted to its business.

One use to which the device may be put in almost any house of considerable size is the routing of traveling salesmen and recording their movements in the field. For this purpose a tack of a given color and standing for a given salesman is inserted at every town the salesman is to visit. In addition to these tacks others may be inserted at various points in the route thus marked out for indicating other facts, such as "prospective trade," "a good town for trade," "unpaid accounts," "commercial rating," &c. After the salesman has started out the operator or routing clerk follows his movements by stretching the cord from town to town as he reports his progress.

The cord is simply for the purpose of graphically indicating the territory traversed by the salesman and his present whereabouts. The tacks indicating facts with which the salesmen have nothing to do are inserted and removed as occasion may require, and no cord is used in connection with them.

Let it be observed that each of the slides has the capacity of two separate slides, if but one side of the panel were used. The advantage of this is that it greatly economizes in the matter of space and also reduces to a considerable extent the cost of the necessary equipment. This double use of the slide is possible only by using a frame which on each side of the panel projects beyond the heads of the tacks or pins.

In Figs. 1, 2, and 3 I have shown the invention as being embodied in a slide; but in Fig. 4 I have shown it in the form of two sections hinged together, so that they may be opened and closed after the manner of a book. The invention resides in the construction of these constituent members, whether they take the form of a slide or any other form.

What I claim as new, and desire to secure by Letters Patent, is—

1. A device for recording business transactions at various geographical points having in combination a panel, a map or diagram on each of its faces, tacks or pins projecting from both faces of the panel at various points on the map or diagram, a frame surrounding the panel and projecting from each face thereof beyond the heads of the tacks or pins, and a cord adapted to be laced over the pins or tacks, substantially as described.

2. A device for recording business transactions at various geographical points, having a panel, a map or diagram secured to each of its faces, tacks or pins adapted to be driven into the panel at various points indicated on the map or diagram, which tacks or pins when so driven in project a considerable distance from the faces of the maps, a frame surrounding the panel and projecting from each face thereof beyond the heads of the tacks or pins when so driven in, in combination with a cabinet adapted to receive a number of said devices, said cabinet and devices having coöperating means whereby the devices are supported independently of each other, substantially as described.

JOHN DAWSON.

Witnesses:
ROBT. A. BOWER,
G. W. HOWARD.